No. 685,674. Patented Oct. 29, 1901.
J. T. COWLEY.
TRANSMITTER FOR USE IN PNEUMATIC DESPATCH TUBE APPARATUS.
(Application filed Feb. 26, 1900. Renewed Oct. 2, 1901.)
(No Model.) 4 Sheets—Sheet 1.
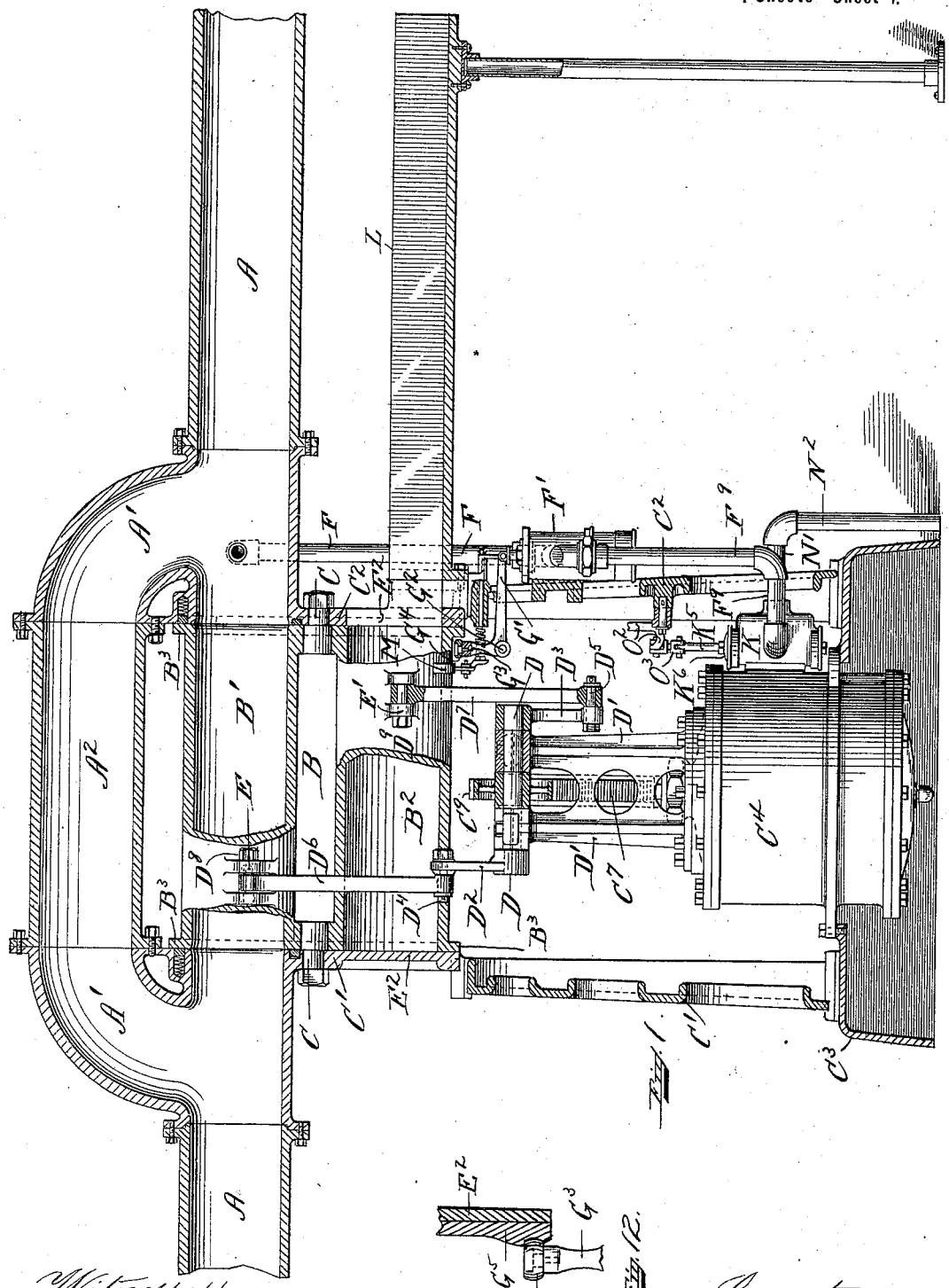

No. 685,674. Patented Oct. 29, 1901.
J. T. COWLEY.
TRANSMITTER FOR USE IN PNEUMATIC DESPATCH TUBE APPARATUS.
(Application filed Feb. 26, 1900. Renewed Oct. 2, 1901.)
(No Model.) 4 Sheets—Sheet 2.
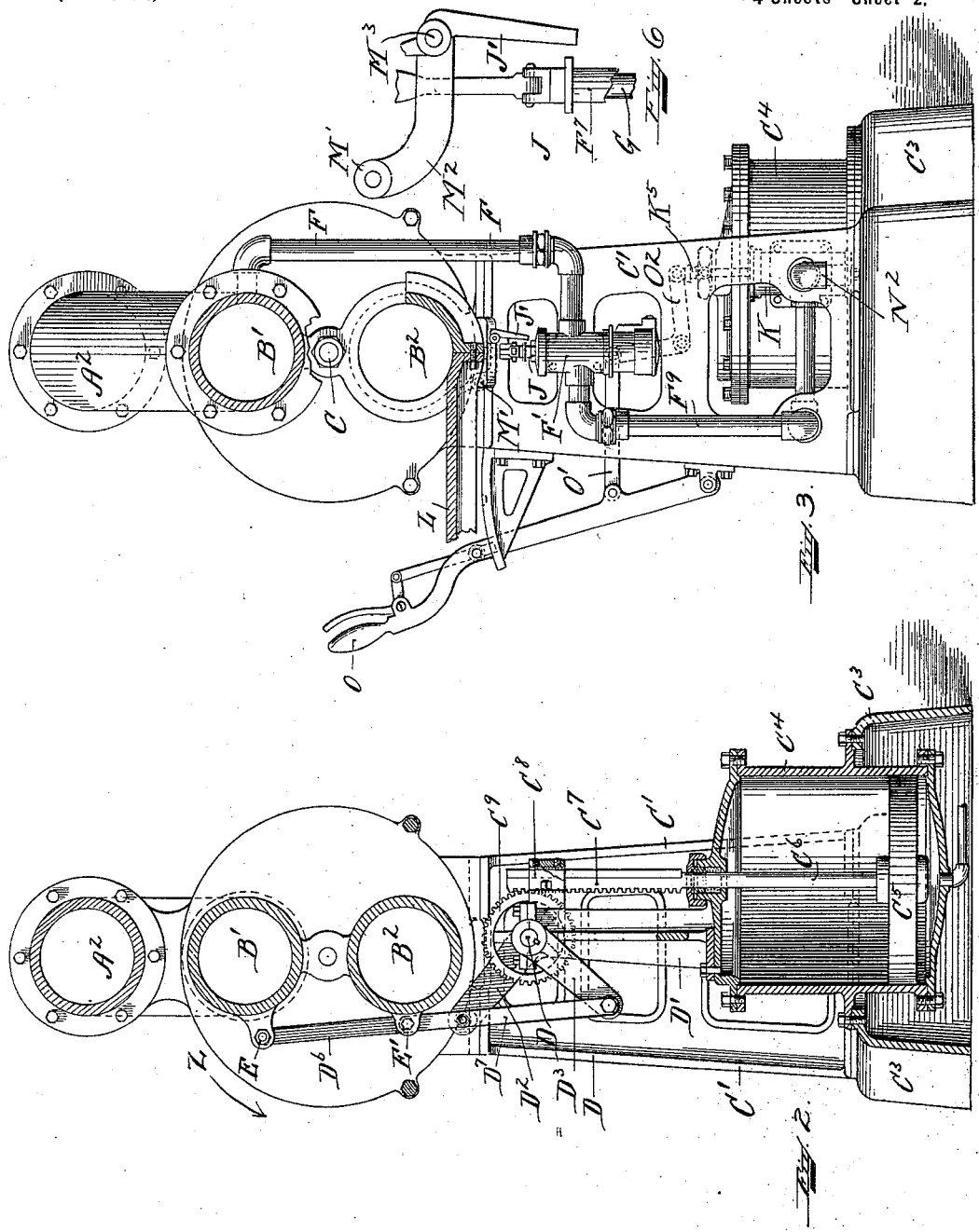

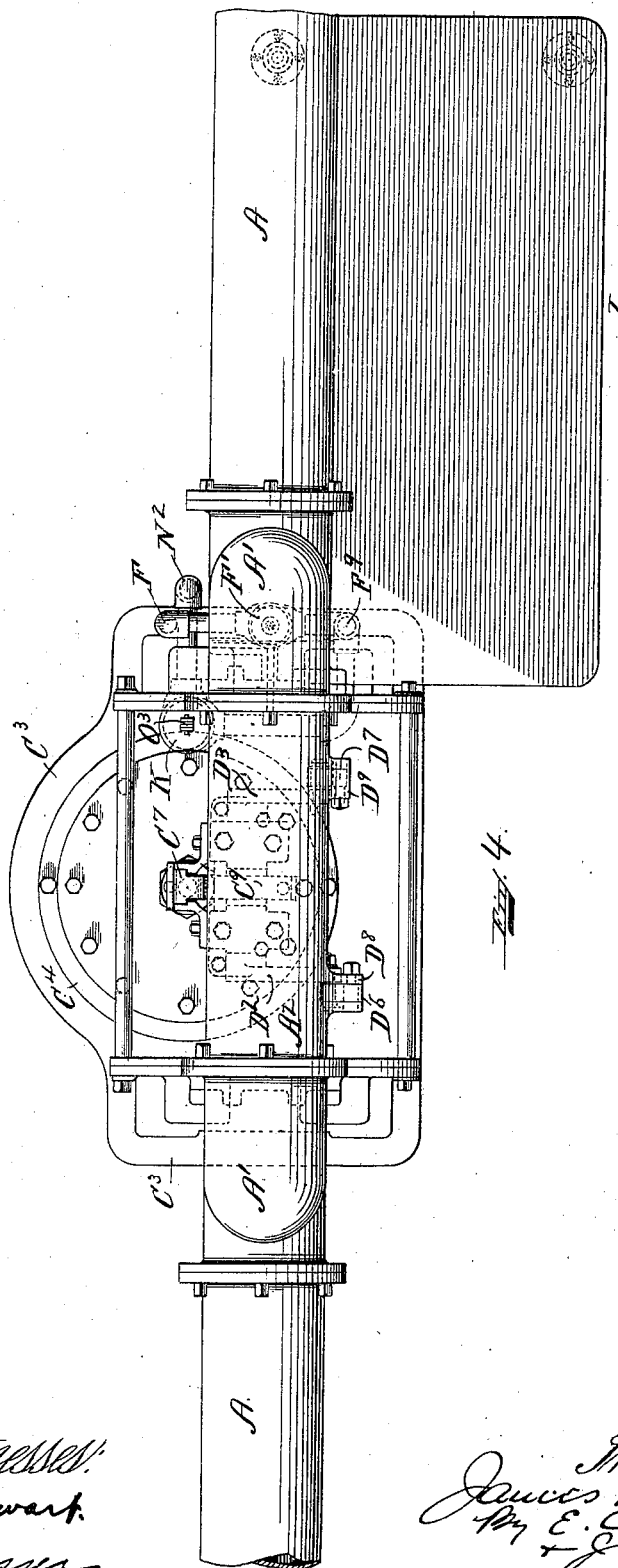

No. 685,674. Patented Oct. 29, 1901.
J. T. COWLEY.
TRANSMITTER FOR USE IN PNEUMATIC DESPATCH TUBE APPARATUS.
(Application filed Feb. 26, 1900. Renewed Oct. 2, 1901.)
(No Model.) 4 Sheets—Sheet 4.
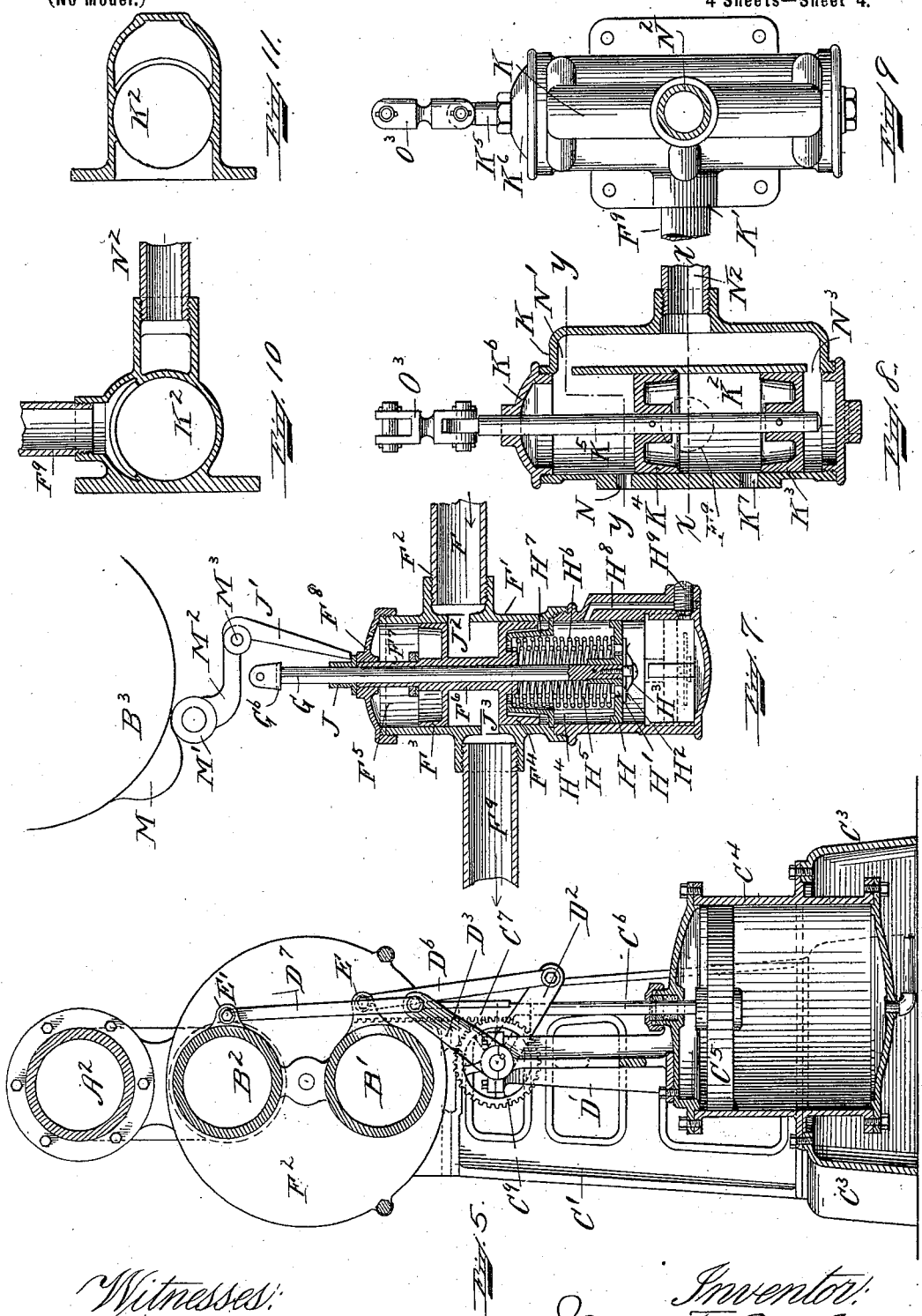

UNITED STATES PATENT OFFICE.

JAMES T. COWLEY, OF LOWELL, MASSACHUSETTS, ASSIGNOR TO THE AMERICAN PNEUMATIC SERVICE COMPANY, OF DOVER, DELAWARE, A CORPORATION OF DELAWARE.

TRANSMITTER FOR USE IN PNEUMATIC-DESPATCH-TUBE APPARATUS.

SPECIFICATION forming part of Letters Patent No. 685,674, dated October 29, 1901.

Application filed February 26, 1900. Renewed October 2, 1901. Serial No. 77,341. (No model.)

*To all whom it may concern:*

Be it known that I, JAMES T. COWLEY, of Lowell, in the county of Middlesex and State of Massachusetts, have invented certain new and useful Improvements in Transmitters for Use in Pneumatic-Despatch-Tube Apparatus, of which the following is a specification.

My invention relates to improvements in transmitters for use in pneumatic-despatch-tube apparatus in which the carriers are propelled by air-pressure; and its object is to provide a transmitter for introducing carriers into the transmission-tube at any point in the line where it is desired to locate a transmitter.

A further object is to provide mechanism for controlling the length of time elapsing between the despatching of the carriers, so that one carrier will not come in contact with another in passing through the transmission-tube.

My invention consists of certain novel features hereinafter described, and particularly pointed out in the claims.

In the accompanying drawings, which illustrate a construction embodying my invention, Figure 1 is a side elevation, partly in section, of the transmitter and operating parts and intermediate of the line. Fig. 2 is an end elevation, partly in section, of the transmitter and operating parts. Fig. 3 is an end elevation of the transmitter and operating parts, showing the transmission-tube and receiving-table in section. Fig. 4 is a plan view of the transmitter and operating parts, also showing the transmission-tube and receiving-table. Fig. 5 is an end elevation, partly in section, of the transmitter and showing the operating parts in an opposite position from that shown in Fig. 2. Fig. 6 is an enlarged detail view of the valve-tripping mechanism, hereinafter described. Fig. 7 is a sectional view of a valve controlling the admission of air to the plunger operating the transmitter and mechanism for releasing said valve. Fig. 8 is a sectional view of the valve for admitting air to the plunger which operates the transmitter. Fig. 9 is a front view of the valve shown in Fig. 8. Fig. 10 is a sectional view through the valve on the line X X, Fig. 8. Fig. 11 is a sectional view through the valve on the line Y Y, Fig. 8. Fig. 12 is a detail view, hereinafter described.

Like letters of reference refer to like parts throughout the several views.

Referring to Fig. 1, A represents a transmission-tube of a pneumatic-despatch-tube apparatus provided with branches $A'$, connected with the tube $A^2$, forming a by-pass for the air from the transmission-tube A. The transmitter B is provided with two transmitting-tubes $B' B^2$, joined together and journaled in the opposite bearings C within the frames $C' C^2$. These supporting-frames are mounted upon the bed-plate $C^3$. Secured also upon this bed-plate is a cylinder $C^4$, having a piston $C^5$ and piston-rod $C^6$, which is provided at its outer end with the rack $C^7$, working within the guide $C^8$. This rack $C^7$ engages with the gear-wheel $C^9$, mounted upon the shaft D, journaled within the opposite standards $D'$. Mounted fast on the outer ends of the shaft D are the arms $D^2 D^3$, having fast in their outer ends the pins $D^4 D^5$, to which one end of the opposite connecting-links $D^6 D^7$ are connected. The opposite ends of these connecting-links $D^6 D^7$ are journaled to the transmitting-tubes $B' B^2$ on the pins $D^8 D^9$ in the lugs $E E'$ on said tubes. The arms $D^2 D^3$ are located on the shaft D at an angle to each other and in the position shown in Figs. 1 and 2, the lengths of the connecting-links $D^6 D^7$ being equal and also the distance from the centers of the lugs $E E'$ and the bearings C, and the distance from the centers of the journal-pins $D^4 D^5$ and the shaft D is equal, so that when the shaft D is rotated by the rack $C^7$, working in the gear $C^9$, the transmitting-tubes $B' B^2$ are rotated in the direction of the arrow Z, Fig. 2, and the transmitting-tube $B^2$ is brought into alinement with the transmission-tube A, while the transmitting-tube $B'$ is moved from the position shown in Fig. 1 and takes the position occupied in said figure by the transmitting-tube $B^2$, as shown in Fig. 5.

The supply-pipe F extends from the transmission-tube A or from any other suitable source of supply and connects with the air-controlling valve $F'$ at $F^2$. This valve is provided with the pistons $F^3$ $F^4$, adapted to work within the cylinder $F^5$. These two pistons are connected together by the sleeve $F^6$. Extending upward from the piston $F^3$ is a sleeve $F^7$, the upper end of which passes through the cap $F^8$, covering the upper end of the cylinder $F^5$. Passing through the pistons $F^3$ $F^4$ is a rod G, having its upper end pivoted to the arm $G'$. (See Fig. 1.) This arm is pivoted at $G^2$ to a bracket extending rearwardly from the frame $C^2$. Extending upward from the arm $G'$ is an arm $G^3$, having on its upper end the roll $G^4$ for engagement with the cam $G^5$ (see Fig. 12) on the flange $B^3$ of the transmitting-tubes $B'$ $B^2$. The object of said cam $G^5$ engaging with the roll $G^4$ is to raise the arm $G'$ and rod G when the transmitting-tubes $B'$ $B^2$ are rotated. Mounted on the lower end of the rod G is the plunger H, having the holes $H'$ normally closed by the plate $H^2$. This plate is held in contact with the plunger H by the spring $H^3$ bearing on the under side of the plate $H^2$. Within the chamber $H^4$ and around the rods G is an inner spring $H^5$, the lower end of the spring bearing on the plunger H and the upper end bearing on the piston $F^4$. Within the chamber $H^4$ there is an outer spring $H^6$, one end of which bears upon the plunger H and the opposite end bears against the upper end of the ring $H^7$. One side of the chamber $H^4$ is provided with a by-pass $H^8$, having at its lower end the adjustable screw $H^9$ for regulating the opening through the by-pass $H^8$. Around the rod G near its upper end is the flanged sleeve J, and this sleeve is adapted to rest upon the cap $F^8$ when in its lowest position, and when the flange is in engagement with the dog $J'$, as shown in Fig. 7, the sleeve $F^7$ is held in its lower position by reason of the said sleeve $F^7$ coming in contact with the flanged sleeve J and preventing the sleeve $F^7$ and the pistons $F^3$ $F^4$ from rising.

With the parts of the valve $F'$ in the positions above described and as shown in Fig. 7 the air-pressure from the supply-pipe F is free to pass through the valve-ports $J^2$ $J^3$ and the valve $F'$ and through the supply-pipe $F^9$ into the admission-valve K, the supply-pipe $F^9$ connecting with the valve K at $K'$. Within the cylinder $K^2$ of the valve K are mounted the pistons $K^3$ $K^4$, both secured upon the rod $K^5$, this rod passing upwardly and through the cap $K^6$ on the upper end of the valve K. With the pistons $K^3$ $K^4$ in the position shown in Fig. 8 air passing into the valve K from the supply-pipe $F^9$ would enter the cylinder $K^2$ between the pistons $K^3$ $K^4$ and would pass out through the port $K^7$ and be carried to the bottom of the cylinder $C^4$ and below the piston $C^5$ within said cylinder, and the air-pressure thereby admitted to the cylinder $C^4$ will raise the piston $C^5$ and through the connections of the piston-rod $C^6$, rack $C^7$, gear $C^9$, shaft D, arms $D^2$ $D^3$, and links $D^6$ $D^7$ the transmitting-tubes $B'$ $B^2$ will be rotated and occupy reverse positions from that shown in Fig. 1 and as shown in Fig. 5, so that the carrier which has been inserted from the table L into the transmitting-tube $B^2$ will be brought into alinement with the transmission-tube A and will be propelled by air-pressure passing through said transmission-tube A. As the transmitting-tubes $B'$ $B^2$ rotate, the cam $G^5$ on the flange $B^3$, connecting the said tubes $B'$ $B^2$, engages with the roll $G^4$ on the upper end of the arm $G^3$, forcing the roll $G^4$ backwardly, and thereby raising the arm $G'$, connected to the upper end of the rod G, and the rod G will be raised, carrying with it the plunger H and compressing the spring $H^5$ $H^6$ within the cylinder $H^4$. As the rotation of the transmitting-tubes $B'$ $B^2$ continues and at the last end of their movement the cam M on the flange $B^3$ engages with the roll $M'$ on the arm $M^2$, pivoted at $M^3$, and the roll $M'$ is lowered and the dog $J'$ is released from the flanged sleeve J, allowing the spring $H^5$ to raise the pistons $F^3$ $F^4$, and the piston $F^4$ will close the port $J^3$, thereby shutting off the passage of the air from the supply-pipe F to the cylinder $C^4$. The chamber $H^4$ is adapted to be filled with oil or other suitable fluid, and this oil will pass downwardly through the openings $H'$ when the plunger H is raised, the plate $H^2$ and spring $H^3$ yielding to allow the oil to pass through the holes $H'$. After the springs $H^5$ $H^6$ have been compressed and the cam $G^5$ has passed beyond the roll $G^4$ the springs $H^5$ $H^6$ will tend to force downwardly the plunger H, and the openings $H'$ being closed the oil is forced upwardly through the port $H^8$, and the opening to this port is controlled by the adjusting-screw $H^9$. The time necessary for the plunger H to be lowered to its normal position can be regulated by adjusting the screw $H^9$. As the plunger H lowers the upper end $G^6$ of the rod G will come in contact with the flanged sleeve J and the sleeve will be moved downwardly and occupy the position shown in Fig. 7 and be again engaged by the dog $J'$. By this mechanism just described after a carrier has been despatched from one of the transmitting-tubes the air from the supply-pipe F is shut off for a predetermined time, depending upon the regulation of the port $H^8$ by the adjusting-screw $H^9$, so that air cannot enter the cylinder $C^4$ and act upon the piston $C^5$ to again change the positions of the transmitting-tubes $B'$ $B^2$ until the pistons $F^3$ $F^4$ are again brought to their normal positions, thereby opening the ports $J^2$ $J^3$ and allowing the air to pass from the pipe F, so that a predetermined time must elapse between the sending of carriers from the transmitting-tubes $B'$ $B^2$. When the piston $C^5$ within the cylinder $C^4$ is raised from the position shown in Fig. 2, air will exhaust from above the piston $C^5$ through the ports N and $N'$ and out through the exhaust-pipe $N^2$, and when the air is admitted above the piston $C^5$ and the piston $C^5$ is forced downward the air will exhaust from below the piston $C^5$, out through the ports K⁷ and N³, and out through the exhaust-pipe N² and pass out to the atmosphere.

After a carrier has been inserted into the transmitting-tube B² the handle O will be moved from the position shown in Fig. 3 in toward the transmitter B, and through the connections of the link O', the bell-crank lever O², and plungers K³ K⁴ the valve K will be lowered to the position shown in Fig. 8, and the positions of the transmitting-tubes B' B² will be changed to assume the positions shown in Fig. 5, as above described. When it is desired to reverse the positions of the transmitting-tubes B' B² to send another carrier from the transmitting-tube B', handle O will be pulled forwardly to the position shown in Fig. 3, and the plungers K³ K⁴ in the valve K will be raised and air will be admitted above the plunger C⁵ in the cylinder C⁴, and the positions of the transmitting-tubes B' B² will again be changed to the position shown in Fig. 2, it being understood that the movement of the handle O in either direction will reverse the positions of the transmitting-tubes B' B² by changing the air-pressure from one side of the piston C⁵ to the other. The by-pass A² serves as a passage for the air during the time the transmitting-tubes B' B² are being moved from one position to the other.

Having thus ascertained the nature of my invention and set forth a construction embodying the same, what I claim as new, and desire to secure by Letters Patent of the United States, is—

1. In a pneumatic-despatch apparatus, a main transmission-tube, a transmitter for the carriers consisting of a series of tubes, a source of compressed air, mechanism operated by compressed air from said source for moving one of said tubes into alinement with the transmission-tube for transmitting a carrier, a valve for controlling the supply of compressed air for operating said mechanism, and means operated by the movement of the transmitter for controlling said valve.

2. In a pneumatic-despatch apparatus, a main transmission-tube, a transmitter for the carriers consisting of a series of tubes, a source of compressed air, a cylinder, a piston located in said cylinder and operated by compressed air from said source for moving one of said tubes into alinement with the transmission-tube for transmitting a carrier, a valve directing the compressed air to the cylinder for operating the piston in opposite directions, means for shifting said valve to direct the compressed air to one side or the other of the cylinder, a valve for controlling the supply of compressed air, and means operated by the movement of the transmitter for controlling said air-supply-controlling valve.

3. In a pneumatic-despatch apparatus, a main transmission-tube, a pivoted transmitter consisting of a series of transmitting-tubes, a source of compressed air, mechanism operated by compressed air from said source for moving one of said transmitting-tubes into alinement with the main tube, a valve controlling said compressed air, and means operated by the movement of the transmitter for controlling said valve.

4. In a pneumatic-despatch apparatus, a main transmission-tube, a transmitter consisting of a series of transmitting-tubes, a source of compressed air, mechanism operated by compressed air from said source for moving one of said transmitting-tubes into alinement with the main transmission-tube, a supply-pipe through which compressed air passes to said mechanism, a valve for controlling said compressed air, means for controlling said valve, and means located in the air-supply pipe for locking the transmitter against movement for a predetermined time.

5. In a pneumatic-despatch apparatus, a main transmission-tube, a transmitter consisting of a series of transmitting-tubes, a source of compressed air, mechanism operated by compressed air from said source for moving one of said transmitting-tubes into alinement with the main transmission-tube, a supply-pipe through which compressed air passes to said mechanism, a valve for controlling said compressed air, means for controlling said valve, means located in the air-supply pipe for locking the transmitter against movement for a predetermined time, and means for controlling the time during which the transmitter is locked against movement.

6. In a pneumatic-despatch apparatus, a main transmission-tube, a transmitter consisting of a series of transmitting-tubes, a source of compressed air, mechanism operated by compressed air from said source for moving one of said transmitting-tubes into alinement with the main transmission-tube, a supply-pipe through which compressed air passes to said mechanism, a valve for controlling said compressed air, means for controlling said valve, means located in the air-supply pipe for locking the transmitter against movement for a predetermined time, and adjustable means for controlling the time during which the transmitter is locked against movement.

7. In a pneumatic-despatch apparatus, a main transmission-tube, a transmitter consisting of a series of transmitting-tubes, a source of compressed air, mechanism operated by compressed air from said source for moving one of said transmitting-tubes into alinement with the main transmission-tube, a supply-pipe through which compressed air passes to said mechanism, a valve for controlling said compressed air, means for controlling said valve, means located in the air-supply pipe for locking the transmitter against movement for a predetermined time, and mechanism operated by the movement of the transmitter for setting the time-lock.

8. In a pneumatic-despatch apparatus, a main transmission-tube, a transmitter consisting of a series of transmitting-tubes, a source of compressed air, mechanism operated by compressed air from said source for moving one of said transmitting-tubes into alinement with the main transmission-tube, a supply-pipe through which compressed air passes to said mechanism, a valve for controlling said compressed air, means for controlling said valve, means located in the air-supply pipe for locking the transmitter against movement for a predetermined time, mechanism operated by the movement of the transmitter for setting the time-lock, and means operated by the movement of the transmitter for releasing the time-lock.

9. In a pneumatic-despatch apparatus, a main transmission-tube, a transmitter for the carriers consisting of a series of transmitting-tubes, a source of compressed air, a cylinder, a piston located in said cylinder and operated by compressed air from said source for moving one of said tubes into alinement with the transmission-tube for transmitting a carrier, a valve directing the compressed air to the cylinder for operating the piston in opposite directions, a handle for shifting said valve to direct the compressed air to one side of the piston to operate the transmitter upon movement in one direction and upon a reverse movement to shift the valve and direct the air to the other side of the piston, a valve for controlling the supply of compressed air, and means operated by the movement of the transmitter for controlling said air-supply-controlling valve.

10. In a pneumatic-despatch apparatus, a terminal, a transmitter for the carriers consisting of transmitting-tubes, mechanism consisting of a shaft having arms for moving said receiver and connecting-rods engaging with said arms and with said receiver, the connections on said arms and on said receiver being of equal distances from the centers of revolution, mechanism for operating said shaft and connecting-rods, means for locking the transmitter against movement for a predetermined time, and mechanism operated by the movement of the transmitter for setting the time-lock.

11. In a pneumatic-despatch apparatus, a terminal, a transmitter for the carriers consisting of transmitting-tubes, mechanism consisting of a shaft having arms for moving said receiver and connecting-rods engaging with said arms and with said receiver, the connections on said arms and on said receiver being of equal distances from the centers of revolution, a gear-wheel fast on said shaft, a cylinder, a piston located on said cylinder and provided with a piston-rod to engage with said gear and operate the same upon the movement of the piston, means for locking the transmitter against movement for a predetermined time, and mechanism operated by the movement of the transmitter for setting the time-lock.

12. In a pneumatic-despatch apparatus, a terminal, a transmitter for the carrier consisting of transmitting-tubes, mechanism consisting of a shaft having arms for moving said receiver and connecting-rods engaging with said arms and with said receiver, the connections on said arms and on said receiver being of equal distances from the centers of revolution, a gear-wheel fast on said shaft, a cylinder, a piston located on said cylinder and provided with a piston-rod having on its outer end a rack adapted to engage with said gear-wheel and operate the same upon the movement of the piston, means for locking the transmitter against movement for a predetermined time, and mechanism operated by the movement of the transmitter for setting the time-lock.

In testimony whereof I have signed my name to this specification, in the presence of two subscribing witnesses, this 16th day of February, A. D. 1900.

JAMES T. COWLEY.

Witnesses:
A. L. MESSER,
C. A. STEWART.